UNITED STATES PATENT OFFICE.

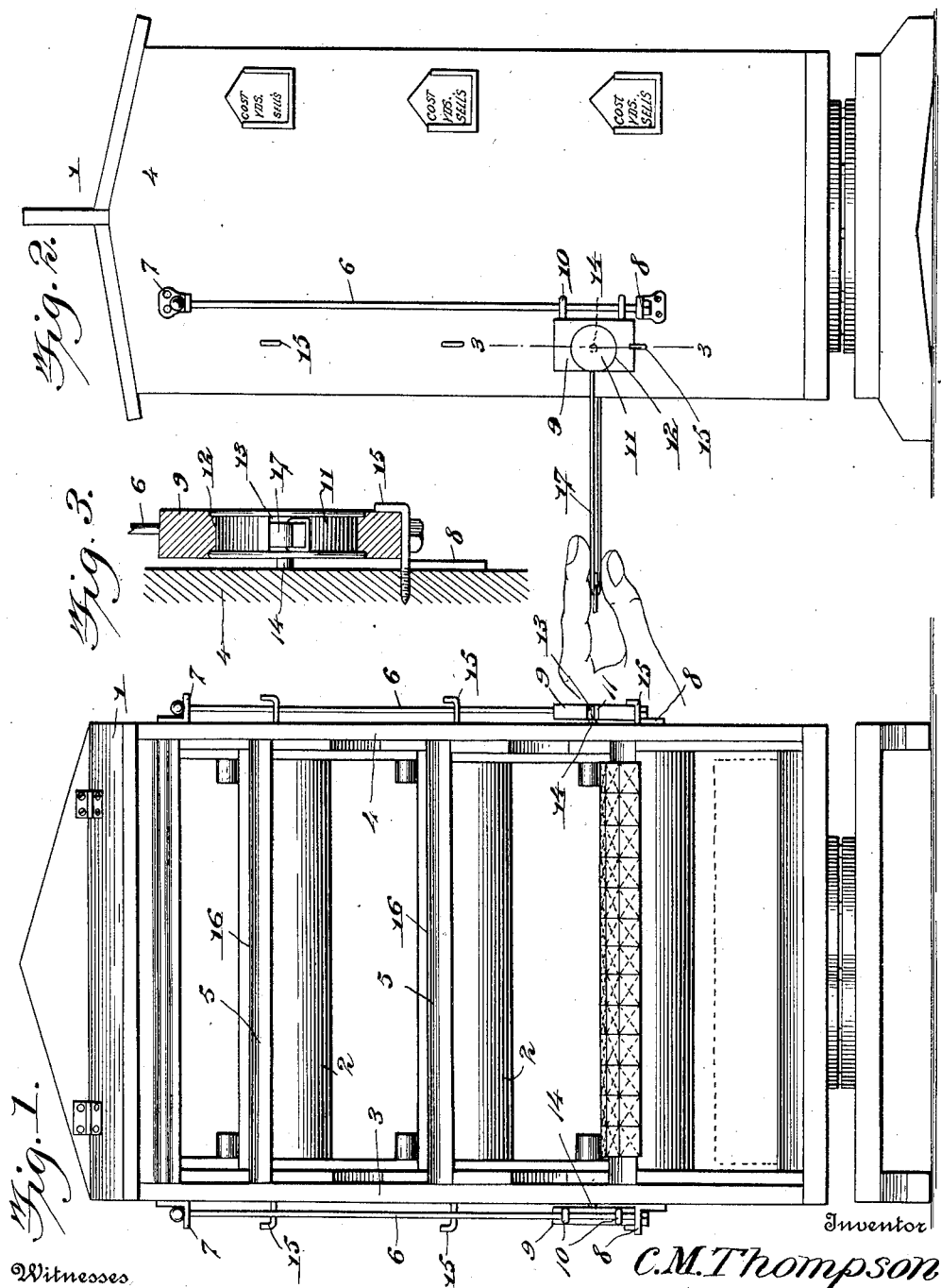

CHARLES M. THOMPSON, OF YELLOW PINE, LOUISIANA.

CLOTH-MEASURING DEVICE.

1,100,629.  Specification of Letters Patent.  Patented June 16, 1914.

Application filed March 26, 1913. Serial No. 756,960.

*To all whom it may concern:*

Be it known that I, CHARLES M. THOMPSON, a citizen of the United States, residing at Yellow Pine, in the parish of Webster and State of Louisiana, have invented new and useful Improvements in Cloth-Measuring Devices, of which the following is a specification.

My invention relates to a measuring device for use in measuring off different lengths of cloth or other material during the act of vending the same from a cabinet or display rack, the primary object thereof being to design a device of this character which is adapted especially for use in connection with the cloth cabinet disclosed in my prior application, Serial No. 706,004, filed June 26, 1912, or for use in connection with any other cabinet, wherein a plurality of relatively spaced roll-holders are provided and it is desirable to employ one measuring tape for measuring the cloth vended from one of the rolls.

A further object is to provide a measuring device of the class described which is simple in construction, and which may be readily applied to any form of cloth cabinet or display device wherein the rolls of cloth are adapted to be vended from relatively spaced roll holders, for efficient use in connection with either roll.

The invention consists in the features of construction, combination and arrangement of parts, hereinafter fully described and claimed, reference being had to the accompanying drawings, in which:

Figure 1 is a front elevation of a cloth cabinet, showing the measuring device applied thereto; Fig. 2 is a side elevation of the cabinet, showing the tape extended for use in measuring the cloth being withdrawn from one of the rolls; and, Fig. 3 is a detail sectional view taken through the holding block for the measuring tape.

In the accompanying figures of drawing, I have shown the measuring attachment applied to a cloth cabinet 1, wherein a plurality of superimposed, relatively spaced roll-holders 2 are mounted between the side walls 3 and 4, a guide bar 5 being mounted in front of each roll-holder for use in connection with a knife or other cutting implement (not shown) during the act of severing cloth from that particular roll. I desire to have it understood, however, that I do not necessarily limit the use of my measuring device to a cloth cabinet of this nature, but that I may employ the device in connection with a frame having a plurality of reels mounted thereon in spaced relation for vending rope or twine, or that I may use the same in connection with any form of vending device, wherein it is necessary to use a tape measure at a plurality of spaced points.

In the present instance, I have mounted a vertically extending rod 6 upon the outer face of the side wall 3 of the cloth cabinet in the brackets 7 and 8 provided for the purpose adjacent the front edge of the said wall. A holding block 9 is mounted upon the rod 6 for vertical sliding movement and for horizontal oscillation thereon by means of the eye bolts 10 which are attached to the inner edge of the said block and receive the rod 6. A spring tape holder 11 is mounted within a recess 12 provided in the block 9 so that the tape opening 13 therein is in communication with the outer edge of the block. The tape holder is of the particular type wherein a central, laterally extending pin is adapted to be pressed so as to cause the tape to be retracted within the holder after being withdrawn for use. This tape holder is so positioned within the recess 12 of the block 9 that the actuating pin 14 is adapted to contact with the wall 3 of the cabinet when the block is pressed inwardly against the same.

A plurality of supporting pins 15 are mounted upon the outer face of the cabinet wall 3 in superimposed relation to each other between the rod 6 and the front edge of the wall, each pin being disposed adjacent the end of one of the roll holders 2 at such a distance below the corresponding guide bar 5 that the tape opening 13 of the tape holder will be in direct horizontal alinement with the upper active edge 16 of the guide bar, when the sliding block is supported by the said pin with its lower edge in engagement therewith. Each pin 15 is provided at its outer end with an upwardly projecting extension for limiting engagement within the notch provided in the outer side face of the block 9 when supported by the same, this extension of the pin being intended to prevent accidental dislodgment of the block from any one of the pins.

When it is desired to measure the cloth from any particular roll, the block 9 is moved upwardly so as to detach the same from the pin upon which it is mounted at the time. It is then swung outwardly and is moved vertically adjacent the particular roll from which the cloth is to be drawn, whereupon it is swung inwardly against the outer face of the wall 2 and is dropped into engagement with the supporting pin. The tape 17 may then be withdrawn as the cloth is drawn from the roll by holding the end of the tape and the corresponding corner of the cloth with one hand and the opposite edge with the other hand. When the cloth has been withdrawn to the desired extent as determined by use of the measuring tape, the cloth is severed at the guide bar 5, by running a knife or other cutting implement along the cloth supported by the upper active edge 16 of the cutting bar, and the tape may then be retracted within its holder by simply pressing the outer free edge of the block inwardly toward the wall of the cabinet, so as to cause pressure to be exerted upon the actuating pin 14 by the latter.

From the foregoing description, taken in connection with the accompanying drawing, it should be apparent that I have provided a measuring device which is adapted for use in connection with a vending cabinet having a plurality of relatively spaced holders for the article to be vended, the said measuring device including a single tape holder which is adapted to be used conveniently in connection with any holder in an efficient manner and with absolute accuracy.

Having thus described my invention, what I claim is:

1. In a device of the class described, the combination with a support, of a vertical rod mounted thereon in spaced relation thereto, a holding block mounted upon said rod for vertical sliding movement and horizontal swinging movement thereon, a tape holder carried by said block and having a spring retracted measuring tape therein, and a plurality of superimposed, relatively spaced pins provided upon the support, each pin being extended laterally therefrom for engagement beneath the said block to support the same in one of its vertically adjusted positions.

2. In a device of the class described, the combination with a support, of a vertical rod mounted thereon in spaced relation thereto, a holding block mounted upon said rod for vertical sliding movement and horizontal swinging movement thereon, a tape holder carried by said block and having a spring retracted measuring tape therein, and a plurality of superimposed, relatively spaced pins provided upon the support, each pin being extended laterally therefrom for engagement beneath the said block to support the same in one of its vertically adjusted positions, each of said pins having an upturned securing extension upon its outer end for engagement with the outer side face of the movable block.

In testimony whereof I affix my signature in presence of two witnesses.

CHARLES M. THOMPSON.

Witnesses:
R. LEE WHITWELL,
W. F. GREER.

---

Copies of this patent may be obtained for five cents each, by addressing the "Commissioner of Patents, Washington, D. C."